United States Patent [19]

Williamson

[11] 3,965,969

[45] June 29, 1976

[54] CONVERTIBLE FOOD SERVICE CART

[76] Inventor: Joseph R. Williamson, 613 W. Cheltenham Ave., Philadelphia, Pa. 19126

[22] Filed: June 11, 1973

[21] Appl. No.: 368,712

[52] U.S. Cl. .................................. 165/12; 165/64; 312/236; 219/386; 219/387; 165/30
[51] Int. Cl.² .................... F25B 29/00; A47B 77/08
[58] Field of Search .......................... 165/12, 30, 64; 219/403, 436, 432, 438, 386, 387, 544, 548; 339/65, 66; 312/236; 338/314, 210, 211, 212

[56] References Cited
UNITED STATES PATENTS

| | | | |
|---|---|---|---|
| 2,472,533 | 6/1949 | Heyman | 338/314 X |
| 3,608,627 | 9/1971 | Shevlin | 165/30 |
| 3,626,155 | 12/1971 | Joeckel | 165/12 |
| 3,674,982 | 7/1972 | Hoyt | 219/403 |
| 3,682,643 | 8/1972 | Foster | 165/30 |
| 3,848,953 | 11/1974 | Petroshanoff | 339/65 |

FOREIGN PATENTS OR APPLICATIONS

| | | | |
|---|---|---|---|
| 1,548,795 | 10/1968 | France | 219/438 |
| 1,082,642 | 9/1967 | United Kingdom | 338/212 |
| 1,006,809 | 10/1965 | United Kingdom | 338/314 |
| 1,079,902 | 8/1967 | United Kingdom | 338/211 |
| 966,506 | 8/1964 | United Kingdom | 339/65 |

Primary Examiner—Charles J. Myhre
Assistant Examiner—William C. Anderson
Attorney, Agent, or Firm—Weiser, Stapler & Spivak

[57] ABSTRACT

A convertible food service cart including a cold tray compartment and a conversion compartment, both of which are insulated and cooled by respective refrigeration systems. The conversion compartment is provided with a plurality of electrical plugs which connect in parallel and which are vertically spaced within the conversion compartment to receive electrical plug receptacles affixed to the hot food conversion trays. The conversion trays include a conductive, flat, heating element which is sandwiched between two sheets of thin, insulating material and provides uniform temperature throughout. The warm food is originally placed in the conversion compartment in refrigerated condition. An automatic programmer is provided to terminate the refrigeration action in the conversion compartment and to activate the tray heating plugs in predetermined time to properly heat the warm food immediately prior to serving.

4 Claims, 9 Drawing Figures

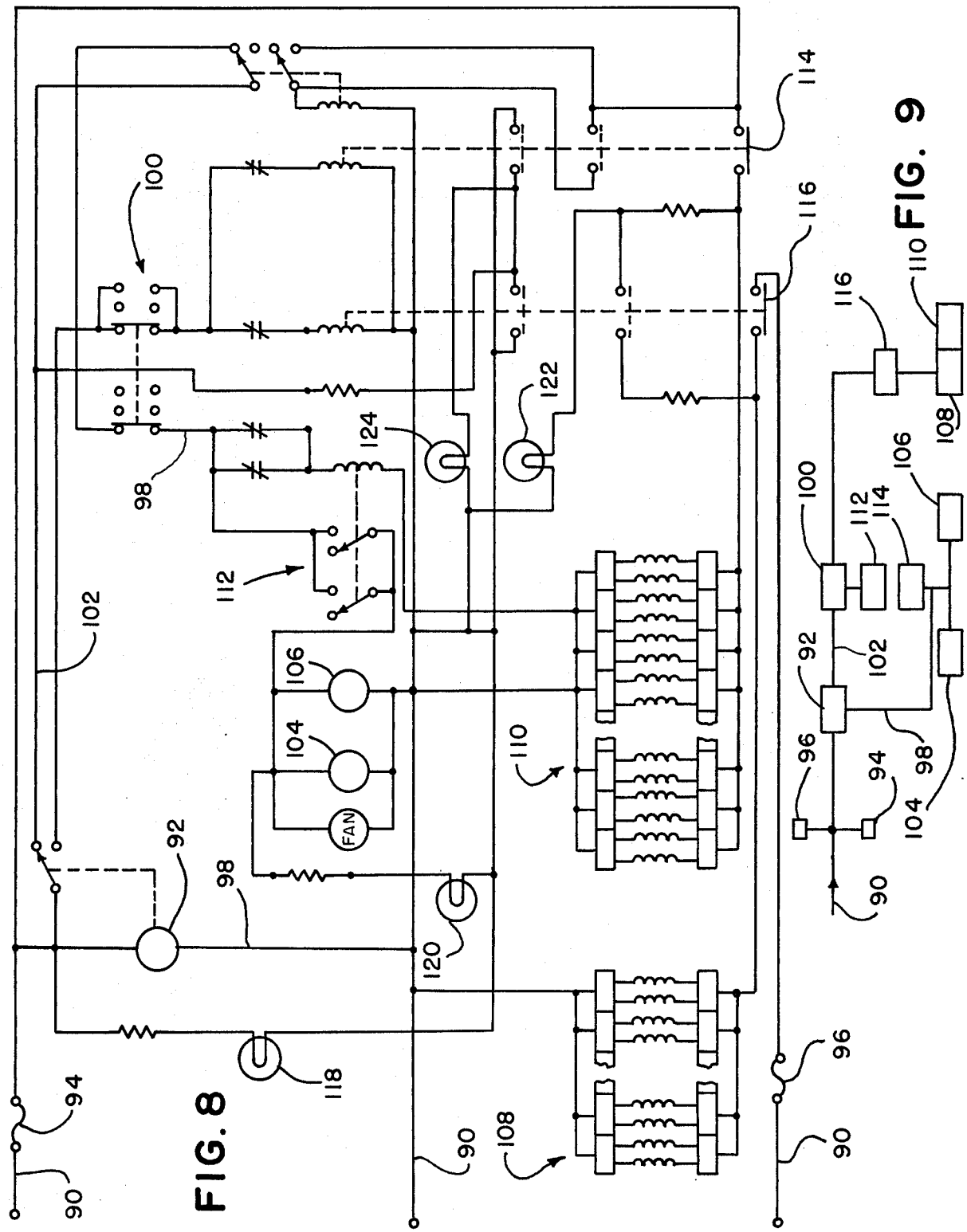

CONVERTIBLE FOOD SERVICE CART

BACKGROUND OF THE INVENTION

The present invention relates generally to the field of food service equipment, and more particularly, is directed to a cart suitable for serving both hot and cold foods.

In many instances, it is necessary or desirable to transport food from the kitchen to the location of use. Because of this need, numerous types of food transporting devices have been developed for such service by prior workers in the art. Quite often, it is desirable to transport both hot and cold foods and occasionally, frozen foods to the area of use. Under such circumstances, it has been the common practice to heat the warm foods at the kitchen, place the hot and cold foods in separate covered containers and then transport all of the food to the place of use. No provisions were provided to reheat the food once it arrived in the area of use. Hospital locations are examplary of this type of operation.

More recently, methods have been developed wherein after the cooked foods were transported to the vicinity of the area of use, additional heating facilities were provided to maintain the food in warm condition until immediately prior to consumption. U.S. Pat. Nos. 1,727,395, 1,513,357 and 1,455,395 all show the use of wheeled vehicles which can be employed to transport both hot and cold foods to various locations and to keep the cooked foods warm at the place of consumption.

The prior art devices have proved somewhat unsatisfactory in use because, generally speaking, the hot foods could not be maintained hot enough and there was no satisfactory method of easily and rapidly handling both hot and cold foods in the meal service area to serve the food at optimum temperatures. Additionally, the prior art devices required that the foods be prepared relatively close to the time of serving so that the cooked foods could be maintained warm. This resulted in cyclical kitchen operation wherein peak periods of feverish activity became the accepted routine coupled with valley periods of substantially no activity. Such peaks and valleys caused inefficient manpower utilization and food quality standards which were lower than desired.

SUMMARY OF THE INVENTION

The present invention relates generally to a hot and cold food serving cart, and more particularly, is directed to a cart having at least two refrigerated compartments, one of which can be readily converted to a food heating compartment.

The present invention includes a cart that is medially divided into hot and cold food storage areas to respectively receive cooked food in the hot compartment and cold foods in the cold compartment. Normally, both areas are refrigerated several hours prior to use to keep all food fresh over extended periods of time. In addition to the cooling cycle, one compartment is provided with a plurality of electrical outlets which receive specially constructed hot food trays having cooperating socket connections.

The hot food trays are specially fabricated of electrically conductive materials so that when energized through the cart electrical outlets, food contained therein may be selectively heated.

Thus, when in use, all cold foods making up a meal will be stored in one of the refrigerated compartments and all of the hot foods would be stored in cold condition in the second of the refrigerated compartments. The entire vehicle can then be wheeled to the place of use and electrically connected to a suitable receptacle. For a timed period of operation, both compartments would remain refrigerated to thereby refrigerate all foods.

In accordance with a preconceived, programmed heating cycle, when so desired, the second compartment refrigeration cycle can be automatically terminated and all of the electrical receptacles activated. Thus, all hot food trays which are plugged into a receptacle will be energized to electrically heat the foods contained therein. By heating through a heating cycle of satisfactory length, the hot food can be brought from a refrigerated condition or even a frozen condition to serving temperatures at the precise time when it is desired to serve the food. Then, by combining the food contained on the hot trays and the cold trays into single portion servings, all of the cold foods can be delivered fresh and all of the hot foods can be delivered hot to the person to be served the meal.

Accordingly, it is an object of the present invention to provide an improved convertible food service cart of the type set forth.

It is another object of the present invention to provide a novel convertible food service cart that includes a refrigerated compartment for cold foods and an adjacent combined compartment which may be employed to refrigerate previously cooked foods and to heat the cooked food prior to use.

It is another object of the present invention to provide a novel convertible food service cart which employs a cold food refrigerated compartment, a hot food refrigerated compartment and means to terminate the refrigerator cycle in the hot food refrigerated compartment and to heat food immediately within a tray.

It is another object of the present invention to provide a novel convertible food service cart employing at least two compartments, both of which compartments may be refrigerated and programmed means to time the refrigeration operation in one compartment so that the compartment may be employed to heat hot foods.

It is another object of the present invention to provide a novel convertible food service cart which employs a convertible hot food storage area having refrigeration means and electrical heating means, the said electrical heating means including a plurality of electrical receptacles and which further employs a plurality of hot food trays which may be energized through the receptacles.

It is another object of the present invention to provide a novel convertible food service cart having a freezer compartment, a refrigerated compartment and a convertible hot food compartment, the hot food compartment having refrigerated means to store food at cold temperatures, electrical heating means to heat the food from a cold condition to a hot condition, said heating means including a plurality of individually energizable electrical receptacles and food heating trays.

It is another object of the present invention to provide a novel convertible food service cart that is rugged in construction, novel in operation and trouble free when in use.

Other objects and a fuller understanding of the invention will be had by referring to the following descrip-

BRIEF DESCRIPTION OF THE DRAWINGS

FIG. 4 is a sectional view taken along Line 4—4 of FIG. 3, looking in the direction of the arrows.

FIG. 5 is an enlarged, partial, elevational view of the hot food compartment, partially broken away to expose internal construction details.

FIG. 6 is a cross sectional view taken along Line 6—6 of FIG. 5, looking in the direction of the arrows.

FIG. 7 is an enlarged top plan view taken along Line 7—7 of FIG. 5, looking in the direction of the arrows.

FIG. 8 is a schematic wiring diagram of the device.

FIG. 9 is a block diagram.

DESCRIPTION OF THE PREFERRED EMBODIMENT OF THE INVENTION

Figure 1:
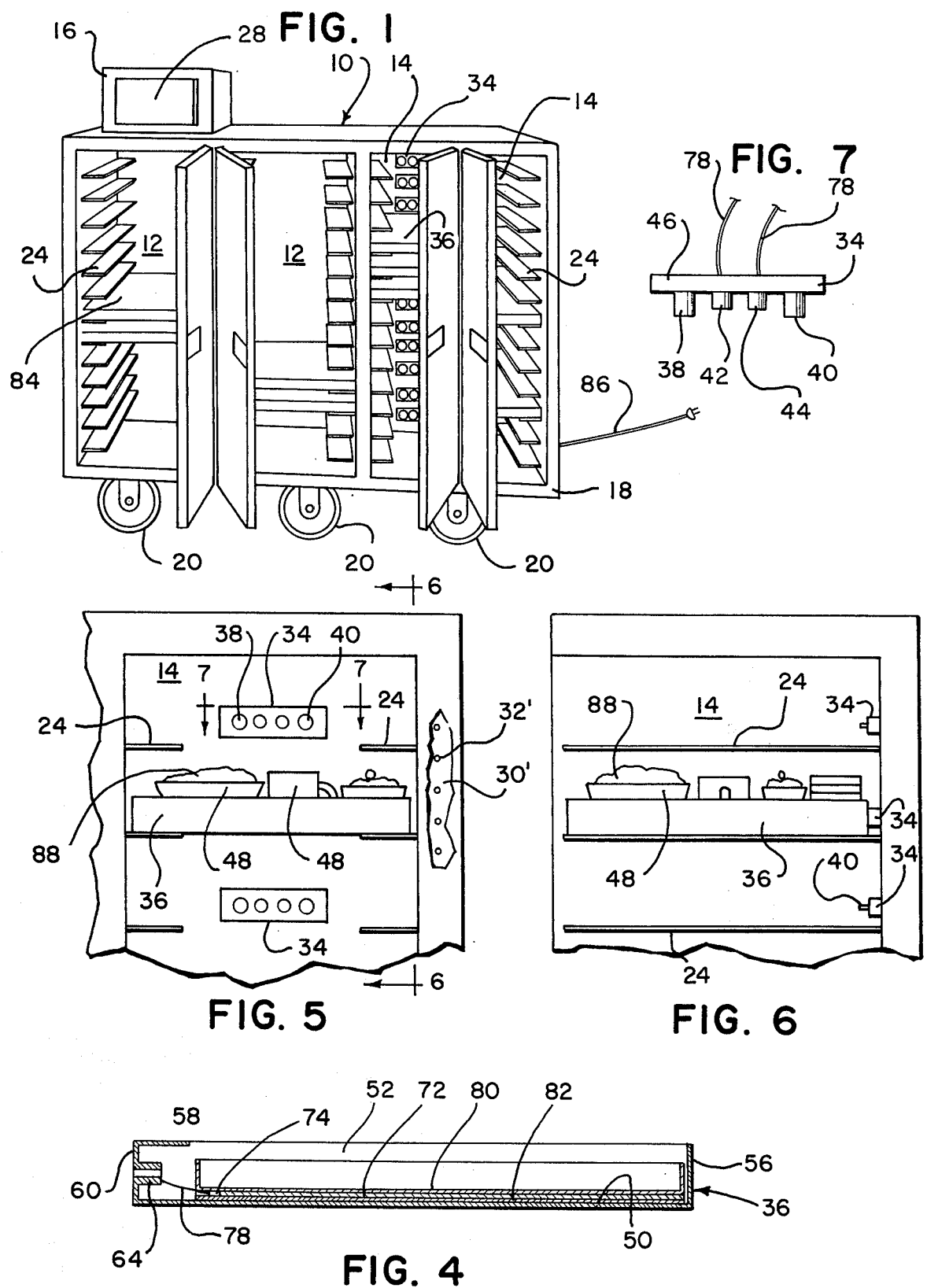
FIG. 1 is a perspective view of a convertible food service cart in accordance with the present invention.

Although specific terms are used in the following description for the sake of clarity, these terms are intended to refer only to the particular structure of my invention selected for illustration in the drawing, and are not intended to define or limit the scope of the invention.

Referring now to the drawings, I show in FIG. 1, a convertible food service cart 10 which comprises generally a cold tray compartment 12, a conversion compartment 14 and an upright freezer compartment 16. The entire apparatus is carried upon a suitable structural beam type chassis 18 which is equipped with a plurality of heavy duty casters 20 to render the cart completely mobile in operation to permit the device to be readily wheeled to any desired location.

Each of the food containing compartments 12, 14 is preferably fabricated of 0.040 polished, hard finish aluminum with cove interior of welded construction. Suitable aluminum right and left tray slide supports 24 of chrome plated heavy duty wire are interiorly secured within the compartments 12, 14 in vertically spaced arrangement to receive hot and cold food containing trays 84, 36 thereon in easily removable manner. In the preferred embodiment, the cold tray compartment 12 is equipped to accommodate forty cold trays and the conversion compartment 14 is equipped to accommodate twenty laminated conversion units, which units are fabricated in the manner hereinafter more fully set forth. The upright freezer compartment 16 is preferably fabricated with similar coved aluminum interior and is equipped with a swing-up type door 28 of conventional construction. The exterior of the cart is fabricated with exterior side and top panels of vinyl clad aluminum of suitable, conventional characteristics to withstand repeated automatic car washing and sanitizing. The entire construction shall comply with the requirements of recognized health regulatory agencies, such as the National Sanitation Foundation.

Figure 2:
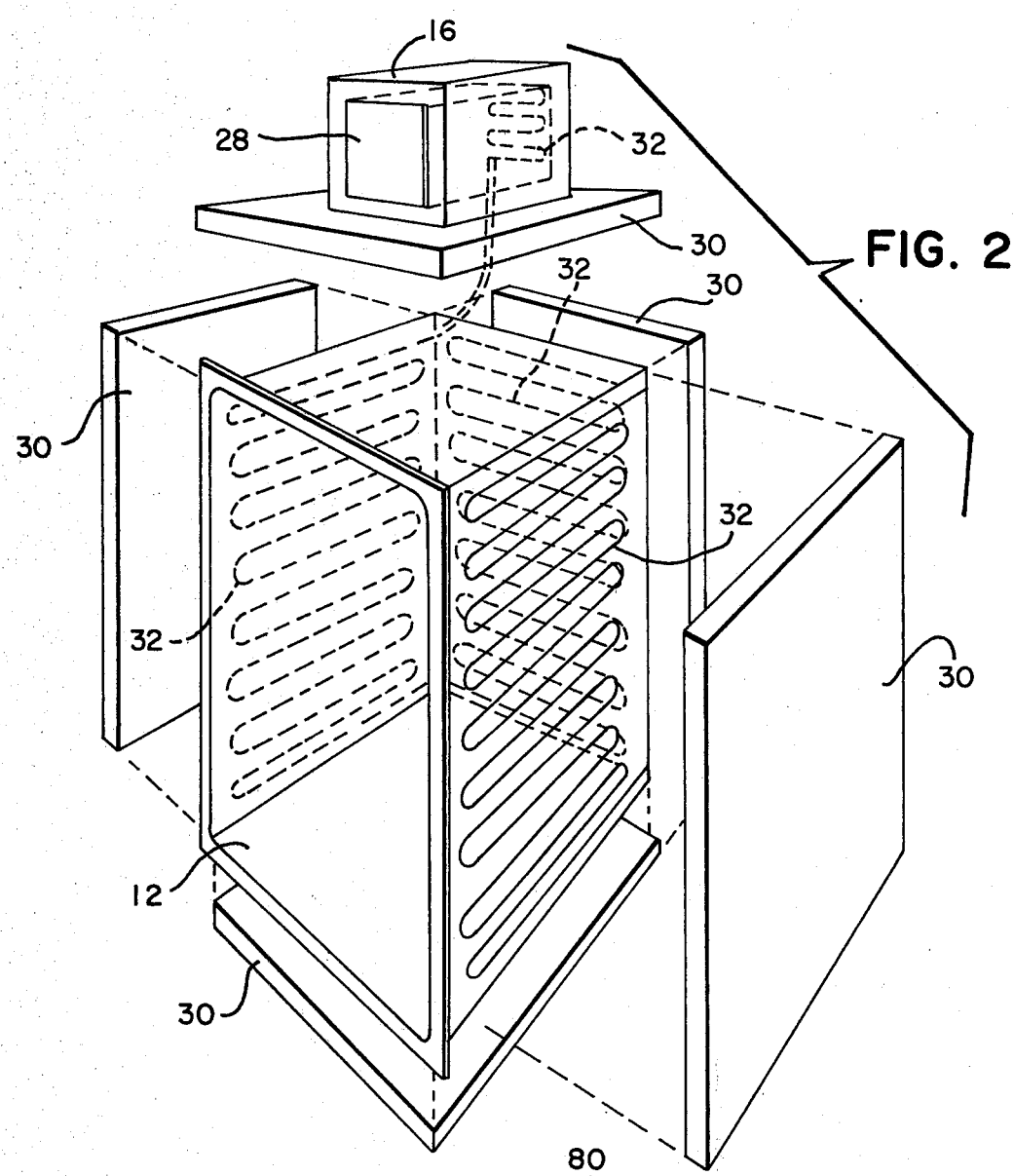
FIG. 2 is an enlarged, exploded view of the freezer and cold tray compartments of the cart.

As best seen in FIG. 2, the cold food compartment 12 is constructed with one and one-half inch urethane insulation panels 30 which are exteriorly laminated to the compartment construction for heat insulation purposes. The compartment 12 is conventionally refrigerated by means of tubular, concealed evaporator capillary tubes 32 which are preferably embedded in the walls of the compartment construction in conventional manner. An air convection system (not shown) is employed within the cold tray compartment 12 to provide uniform temperature distribution throughout in the usual manner. The conversion compartment 14 is similarly constructed and employs insulated panels 30' and refrigeration tubing 32' (FIG. 5). Preferably, a single, one-quarter horsepower condensing unit (not shown) is employed to maintain the desired temperatures in the freezer compartment 16 and the cold tray compartment 12. The conversion compartment is similarly constructed to the cold food compartment 12 and is similarly refrigerated. Preferably, a separate one-quarter horsepower condensing unit (not shown) is employed to maintain refrigerated conditions within the conversion compartment 14 when so desired. The function of the refrigeration system within the conversion compartment 14 hereinafter controlled by a master electronic programmer in the manner hereinafter more fully set forth.

As best seen in FIGS. 1, 5, 6 and 7, the conversion compartment 14 is provided with a plurality of vertically spaced, surface mounted electrical plugs 34, one such plug being provided between each vertically spaced pair of tray slide supports 24, 26 to thereby provide electrical heating facilities for each hot food conversion tray 36. It is noteworthy that the electrical heating facilities are employed to heat only the conversion trays 36 themselves and do not function to heat the food 88 by warming the entire atmosphere within the conversion compartment 14 in the manner of oven heating.

The electrical plugs 34 are wired in parallel in conventional manner and are each supplied with one hundred and ten volt, single phase, alternating current. The plugs are preferably surface mounted (FIG. 6) and project interiorly into the compartment 14. Each plug comprises a pair of transverse, positioning lugs 38, 40 and a pair of interiorly positioned electrical plug contacts 42, 44. The plug base 46 is fabricated in conventional manner of sufficient body and electrical insulating characteristics to sustain repeated use without fracture or other permanent deformation. The entire electrical plug assembly 34 should be fabricated in suitable manner to meet nationally recognized safety standards, such as the National Electrical Code and should be constructed of suitable material to be listed by recognized rating agencies, such as Underwriters Laboratories', Inc. The entire compartment 14 is insulated by employing one and one-half inch structural urethane panels 30' which are laminated to the compartment exterior assembly. Compartment refrigeration is accomplished by means of the capillary tubes 32'. See FIG. 5.

Figure 3:
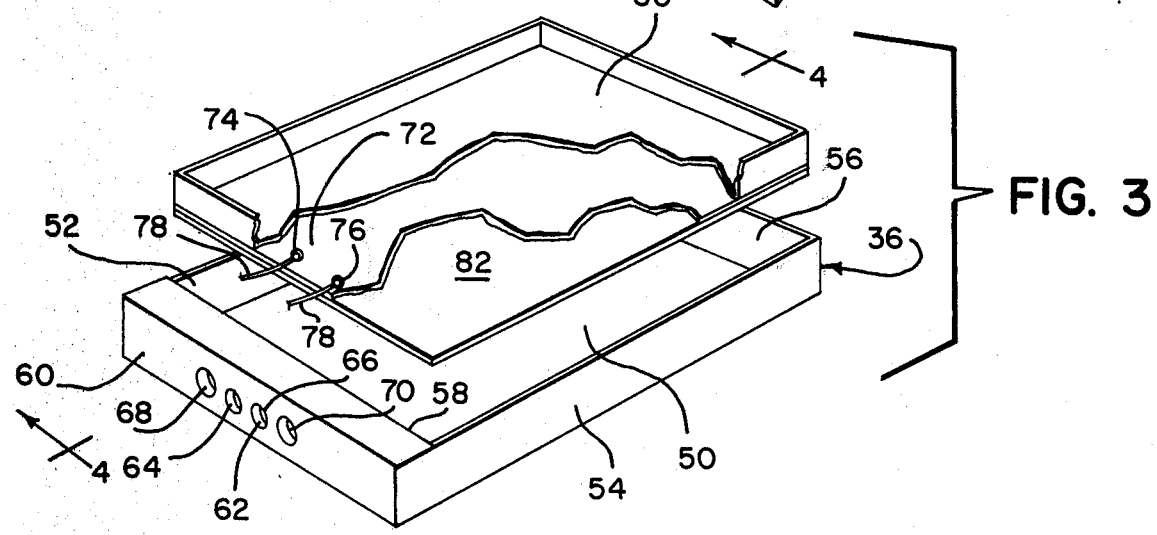
FIG. 3 is an enlarged, exploded view of the hot food conversion tray.

Referring now to FIGS. 3 and 4, I show a hot food conversion tray 36 which is suitable for use with conventional dinnerware 48 such as china, pyroceram, airline plastic, aluminum foil or paper dinnerware. Each conversion tray 36 is fabricated to a generally planar configuration having a flat bottom surface 50 which terminates outwardly in upwardly extending side flanges 52, 54, a rear flange 56 and a front flange 58. An electrical connecting assembly 60 forwardly joins the front flange 58 and carries the electrical plug receptacle 62 in a structurally secure manner. The plug receptacle 62 comprises a pair of female receptacles 64, 66 of suitable design to electrically interconnect with the electrical plug contacts 42, 44 when a hot food conversion tray 36 is placed upon the tray slide supports 24, and is urged rearwardly into contact with the electrical plug 34. The plug receptacle 62 includes a pair of transversely positioned structural openings 68, 70 which receive the positioning lugs 38, 40 therein to assure structurally secure, positive electrical contact between the tray 36 and the electrical plug 34.

The tray 36 is fabricated to include a heating element 72 of the type suitable to develop uniform heat over the entire surface area. One heating element which has been found suitable is a flat element fabricated of a flexible, conducting, sheet material of glasscloth impregnated with conductive silicone elastomer. The heating element 72 should be provided with permanent, high temperature electrical connections 74, 76 to which the receptacles 64, 66 are respectively connected, such as by suitable, high temperature, electrical conductors 78. The heating element 72 is sandwiched between a pair of upper and lower electrically insulating sheet materials 80, 82 which are heat conductive. Silicone bonded mica paper sheet, as manufactured by Essex Corporation, has been found suitable for this purpose. Also, mica sheets of 0.3mm thickness sealed with high temperature silicone rubber has been found suitable for this purpose. The heating element 72 should possess high thermal stability, a positive temperature coefficient of resistance, uniform heat transmission distribution over the entire heating surface and waterproofness. A device having an electrical rating of 280 watts, 120 volt, 60 cycle, single phase has been found satisfactory for the purpose.

In operation, food is placed in the food service cart 10 in the kitchen (not shown) in the refrigerated condition. Foods that would normally be served cold are placed on cold food trays 84 and placed upon the tray slide supports 24 within the cold tray compartment 12. Food that would normally be served warm is placed within suitable dinnerware 48, which dishes are then placed upon the hot food conversion tray 36. The hot food conversion trays 36 are introduced into the conversion compartment 14 and the electrical plug receptacles 62 are electrically associated with the respective electrical plugs 34 in electrical conductive manner. All food within both the cold food compartment 12 and the conversion compartment 14 is maintained in the refrigerated condition by employing the respective capillary tubes 32, 32' and the respective refrigeration compressors (not shown). If the meal will include frozen food such as ice cream, this food will be placed into the freezer compartment 16 at the same time as the hot and cold foods are respectively placed in the compartment 14, 12. With food in either the cold or frozen condition, the entire food service cart 10 is then wheeled into the area of use and the power cord 86 is plugged into a special electrical receptacle (not shown) which is provided in the food service area. The twenty-four hour time switch is pre-set as desired and programmed for the three meal service. The time switch functions both the refrigeration cycle and the electrical heating cycle within the conversion food compartment 14 in a desired manner so that the refrigeration function is terminated prior to food service time and the electrical heating circuit is activated in sufficient time to allow the warm food 88 which is held within the dinnerware 48 to be heated from a refrigerated condition to a suitable serving condition in sufficient time to be served hot and palatable at the desired time.

Referring now to FIGS. 8 and 9, the operation of the convertible food service cart 10 will now be described. Incoming power, for example a 208/236 volt, single phase, thirty amphere-power supply 90 is directed to the main control switch 92 through the circuit breakers 94, 96. The main control switch is in the form of a double throw switch which in one position energizes the refrigeration circuit 98 to permit operation of the refrigeration system only, by by-passing the program timer control 100. When thrown to its second position, the main control switch 92 energized the conversion operation circuit 102 to permit programmed operation by function of the program timer control 100. For this purpose, I prefer to utilize a timer control as manufactured by Paragon Manufacturing Company Division of A.M.F., Model 1215, 24 hour control with 15 minute increments and 10 hour spring wound carryover.

In the automatic mode, the program timer 100, which has a ten hour, spring wound carryover, controls both the heating and refrigeration cycles at preselected meal service periods which can be manually set on the program timer 100. In this mode, the refrigeration systems are normally in operation. Approximately forty-five minutes prior to the time the meal served, desired to be served, the program timer 100 shuts down the refrigeration compressors 104, 106 and all power is directed to the two series 108, 110 of heating elements 72 which are laminated within the conversion trays 36. At the end of the 45 minute conversion heating cycle, the program timer 100 cuts off the power to the conversion heating elements 108, 110 and the power is switched to a time delay relay 112, which acts to prevent operation of the refrigeration compressors 104, 106 for a predetermined period of time until after the meal has been served, The time delay relay 112 may be a 45 to 60 minute delay relay as manufactured by Paragon Manufacturing Company. By introducing a time delay into the circuit after the food has been warmed, adequate time is provided to permit the meal to be served and eaten. The sequence of operation is completely automatic and requires no attention on the part of the operator, except, to be sure that the power cord 86 is plugged into a power source (not shown) at or near the point of food service.

A contact relay 114, which may be as manufactured by Elmwood or G.E., thirty amphere capacity is interposed between the time delay relay 114 and the compressors 104, 106 to vary the voltage in conventional manner for compressor operation. Similarly, a similar contactor 116 is interposed between the program timer control 100 and the conversion heating elements 108, 110 in conventional manner as may be required for operational purposes. Preferably, a plurality of lamps are wired into the circuit to give visual indication of the circuit condition at any particular time during the operating cycle. For example, an amber lamp 118 can be wired in series with the power supply 90 to indicate a "power on" or "power off" condition. A blue lamp 120 wired into the compressor circuit would visually indicate when the compressors 104, 106 were in operation Similarly, a red lamp 122 could be wired to indicate function of the heating elements 108, 110. A green lamp 124 could be provided to be functioned by the program timer 100 to indicate the end of the heating cycle when the warm food 88 was ready to be served.

Preferably, the tray 36 is fabricated of sealed and waterproofed construction to thereby permit the trays to be placed in automatic dishwashing equipment. The trays may be suitably sealed by employing welded aluminum seams or the trays may be hermetically sealed by a molded plastic technique. Any other suitably sealing construction to prevent seepage of water to the heating element in accordance with known practices by those skilled in the art would also be acceptable.

Although I have described the present invention with reference to the particular embodiments therein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

I claim:

1. In a convertible food service cart suitable for storing food in a refrigerated condition in a container placed upon a tray and for heating at least part of the food, the combination of
   A. a first compartment defining an interior space,
      1. said first compartment including first means to refrigerate the food within the first compartment by lowering the temperature within the interior space,
      2. said first compartment also including second means to heat the food within the first compartment,
         a. said second means including a plurality of hot food conversion trays,
            1. at least some of the conversion trays including a heating element and a connected electrical plug receptacle,
            2. said conversion trays receiving a plurality of food containing dishes thereon for heating purposes,
         b. the second means further including a plurality of electrical plugs communicating with the interior of the first compartment,
            1. the receptacle of said conversion trays being electrically interconnected with one said electrical plug to electrically energize the heating element,
            2. said heating element heating the food within the container but not heating the interior space; and
   B. program means to time the cycle of operation of the first means and the second means,
      1. said program means including a timer and a time delay relay, the said time delay relay functioning after activation of the second means to prevent function of the first means for a predetermined time delay period,
      2. the program means further includes carryover means, the said carryover means functioning the timer during periods when the cart is being moved whereby the timer can continue to program the operation of the first and second means even though the cart is disconnected from a source of power.

2. The convertible food service cart of claim 1 wherein the electrical heating means heat the conversion tray and food contained thereon, but does not heat the atmosphere within the first compartment.

3. In a convertible food service cart suitable for storing food in a refrigerated condition and for heating part of the food, the combination of
   A. a first compartment
      1. said first compartment including first means to refrigerate the food within the first compartment,
      2. said first compartment also including second means to heat the food within the first compartment,
         a. said second means including a pluarality of hot food conversion trays,
            1. at least some of the conversion trays including a heating element and a connected electrical plug receptacle,
            2. said conversion trays receiving a plurality of food containing dishes thereon for heating purposes,
         b. the second means further including a plurality of electrical plugs communicating with the interior of the first compartment,
            1. the receptacle of said conversion trays being electrically interconnected with one said electrical plug to electrically energize the heating element; and
   B. program means to time the cycle of operation of the first means and the second means,
      1. said program means including a timer,
      2. the program means including a time delay relay, the said time delay relay functioning after activation of the second means to prevent function of the first means for a predetermined time delay period,
      3. the program means including a carryover means, the said carryover means functioning the timer during periods when the cart is being moved whereby the timer can continue to program the operation of the first and second means even though the cart is disconnected from a source of power.

4. The convertible food service cart of claim 1 wherein the electrical heating means heats the conversion tray and food contained thereon, but does not heat the atmosphere within the first compartment.

* * * * *